(12) United States Patent
Kohno et al.

(10) Patent No.: US 6,386,257 B1
(45) Date of Patent: May 14, 2002

(54) PNEUMATIC RADIAL TIRES WITH CIRCUMFERENTIAL CORD BELT LAYER HAVING SPECIFIED CORD TWISTING STRUCTURE

(75) Inventors: Yoshihide Kohno; Eiji Yamanaka; Toshinobu Kobayashi, all of Kodaira; Takayuki Sato, Wako, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/330,213

(22) Filed: Jun. 11, 1999

Related U.S. Application Data

(62) Division of application No. 08/540,910, filed on Oct. 11, 1995, now Pat. No. 5,968,295.

(30) Foreign Application Priority Data

| Dec. 9, 1994 | (JP) | 6-306242 |
| Dec. 9, 1994 | (JP) | 6-306243 |
| Mar. 23, 1995 | (JP) | 7-63282 |
| Mar. 23, 1995 | (JP) | 7-63881 |
| Sep. 25, 1995 | (JP) | 7-245989 |

(51) Int. Cl.$^7$ ............... B60C 1/00; B60C 9/18; B60C 9/20; B60C 9/22
(52) U.S. Cl. ........ 152/527; 152/526; 152/531; 152/532; 152/533; 152/534; 152/537
(58) Field of Search ............... 152/531, 533, 152/534, 527, 526, 532, 537

(56) References Cited

U.S. PATENT DOCUMENTS

| 3,667,529 A | 6/1972 | Mirtain |
| 3,931,844 A | 1/1976 | Mirtain |
| 4,889,174 A | 12/1989 | Oshima et al. |
| 5,339,878 A | * 8/1994 | Takase ............ 152/531 X |
| 5,908,520 A | * 6/1999 | Kodama ............ 152/533 X |

FOREIGN PATENT DOCUMENTS

| AU | 533210 | 6/1981 |
| EP | 0 360 538 | 3/1990 |
| EP | 0 629 518 A1 | 12/1994 |
| EP | 0 661 180 A1 | 7/1995 |
| FR | 2244634 | 4/1975 |
| FR | 2443342 | 7/1980 |
| FR | 2566335 | 12/1985 |
| JP | A 62-152904 | 7/1987 |
| JP | A 4-163212 | 6/1992 |
| JP | 6-115314 | 4/1994 |
| JP | 7-61208 | 3/1995 |
| WO | 94/14625 | * 7/1994 |

OTHER PUBLICATIONS

Mechanics of Pneumatic Tires, ed. Samuel Clark: U.S. Department of Transportation, Aug. 1981, p. 69.*
Mechanics of Pneumatic Tires, ed. Samuel Clark, U.S. Dept. of Transportation, pp. 25–29, 129 and 878, 8/81.
Patent Abstracts of Japan, JP–A–6–247105, Sep. 16, 1994, Bridgestone Corp.
Patent Abstracts of Japan, JP–A–5–286304, Nov. 2, 1993, Bridgestone Corp.

* cited by examiner

Primary Examiner—Adrienne C. Johnstone
(74) Attorney, Agent, or Firm—Sughrue Mion, PLLC

(57) ABSTRACT

A pneumatic radial tire for passenger car comprises a circumferential belt layer in addition to a slant belt layer, in which specified PET, nylon, PEN or vinylon fiber cords or steel cords are used in the circumferential belt layer.

15 Claims, 4 Drawing Sheets

FIG_1
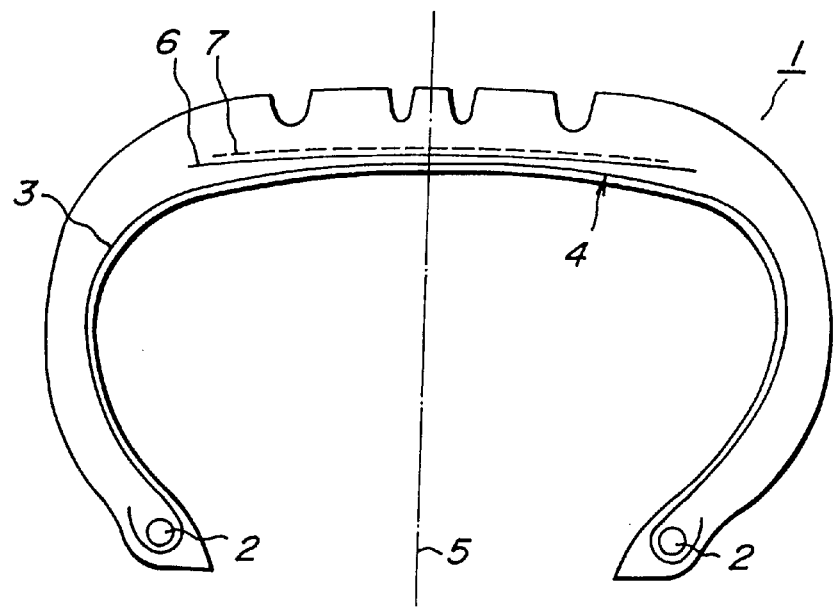
FIG_2
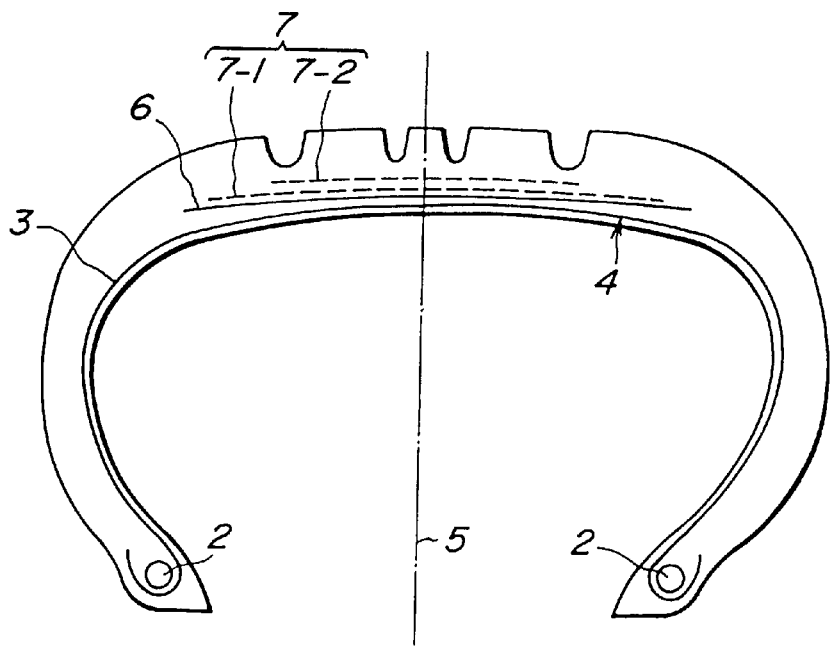

FIG_3
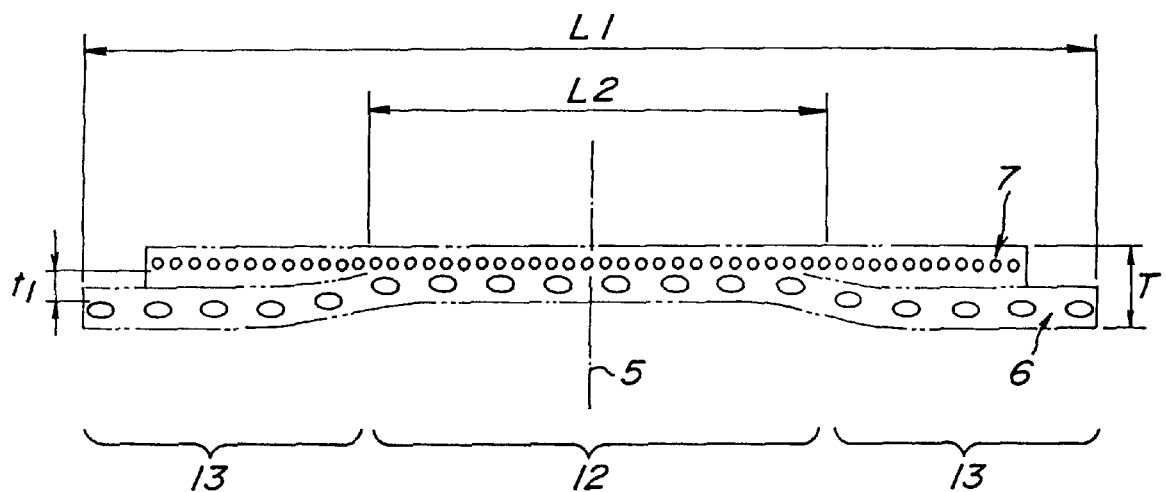
FIG_4
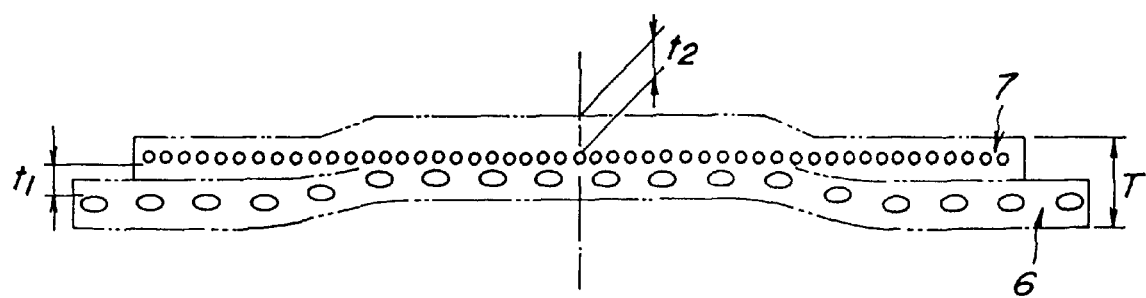

FIG_5
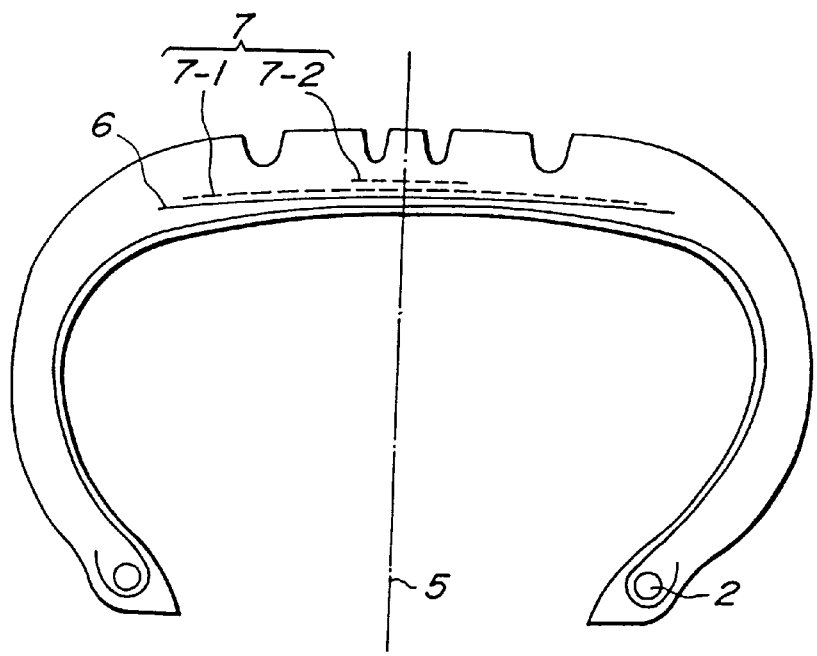
FIG_6
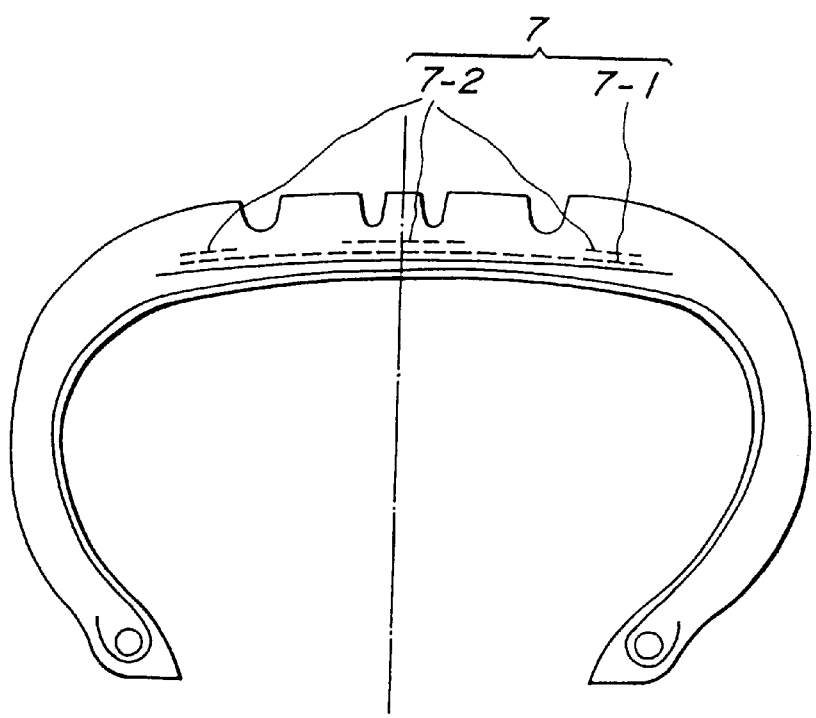

PNEUMATIC RADIAL TIRES WITH CIRCUMFERENTIAL CORD BELT LAYER HAVING SPECIFIED CORD TWISTING STRUCTURE

This is a divisional of application Ser. No. 08/540,910 filed Oct. 11, 1995, now U.S. Pat. No. 5,968,295 the disclosure of which is incorporated herein by reference.

BACKGROUND OF THE INVENTION

1. Field of the Invention

This invention relates to a pneumatic radial tire having excellent cornering properties and either or both of durability and high-speed durability. More it relates to a pneumatic radial tire for use in general-purpose passenger cars mainly developed for weight reduction.

2. Description of the Related Art

With the demand for energy saving, it has been attempted to improve the fuel consumption in automobiles by reducing the weight, and this in turn tends to raise the demand for weight reduction in tires. Particularly, this is true in pneumatic radial tires for use in general-purpose passenger cars.

In general, a pneumatic radial tire comprises a so-called cross belt formed by laminating at least two slant belt layers on an outer periphery of a carcass crown portion to cross cords of these layers with each other. From a viewpoint of tire weight reduction, there have been developed tires comprising a belt composed of a single slant belt layer and a circumferential belt layer(s) containing light-weight organic fiber cords arranged substantially in parallel to an equatorial plane of the tire. The tire of this type is disclosed in, for example, JP-A-62-152904 and JP-A-4-163212.

In the tires disclosed in these prior art publications, organic fiber cords having a high tensile rigidity in the circumferential direction such as aromatic polyamide fiber cords (e.g. Kevlar cord) and the like are used as a cord in the circumferential belt layer. Further, it is disclosed that the circumferential belt layer can control the pushing out of the tread portion through centrifugal force during the high-speed running to improve the high-speed durability.

Moreover, organic fiber cords widely used as a cord for a carcass ply such as polyethylene terephthalate (hereinafter abbreviated as PET) fiber cord, nylon fiber cord, polyethylene naphthalate (hereinafter abbreviated as PEN) fiber cord and vinylon (PVA) fiber cord are considerably low in tensile rigidity in the circumferential direction as compared with the aromatic polyamide fiber cord, so that they are hardly even applied as a cord for the circumferential belt layer. Also, the use of steel cords for the circumferential belt layer is unfavorable from a viewpoint of weight reduction and the like, so that steel cords are hardly even used in the circumferential belt layer.

When aromatic polyamide fiber cords are used in the circumferential belt layer, however, the resistance to compression fatigue is poor, so that it has been confirmed that the belt is apt to create compression breakage accompanied with buckling deformation of the belt generated during the severe cornering.

SUMMARY OF THE INVENTION

The inventors have made various studies with respect to the use of organic fiber cords in the circumferential belt layer and found that PET, nylon, PEN and vinylon fiber cords, which have never been used in the circumferential belt layer in the past, can be used in the circumferential belt layer by rationalizing the twisting structure, total denier and twist constant of such a cord, and also high-strength steel cords formed by rationalization of the twisting structure can be used in the circumferential belt layer without increasing the tire weight so much.

It is, therefore, an object of the invention to provide pneumatic radial tires having excellent cornering property and either or both of durability and high-speed durability by using rationalized PET fiber cords, nylon fiber cords, PEN fiber cords, vinylon fiber cords or steel cords in the circumferential belt layer, particularly pneumatic radial tires for use in general-purpose passenger cars for attaining the reduction of tire weight.

According to the invention, there is provided of a pneumatic radial tire comprising a carcass toroidally extending between at least a pair of bead cores and a belt superimposed on a crown portion of the carcass and comprised of one slant belt layer containing a plurality of cords or filaments arranged at a given inclination angle with respect to an equatorial plane of the tire and at least one circumferential belt layer laminated on the slant belt layer and containing a plurality of cords arranged substantially in parallel to the equatorial plane, an improvement wherein the cord used in the circumferential belt layer is made from PET, nylon, PEN or vinylon fiber and has a layer twisting structure and a total denier $D_T$ of 1000 d–6000 d and a twist constant $N_t$ represented by $N_t = T \times (0.139 \times D_T 2 \times 1/\rho)^{1/2} \times 10^{-3}$ of not more than 0.3 in case of PET or nylon fiber, not less than 0.5 in case of PEN fiber, or not less than 0.6 in case of vinylon fiber, wherein T is a twisting number (twist turns/10 cm) and $\rho$ is a specific gravity.

The term "layer twisting structure" used herein means that one or more fibers are twisted in a certain direction (cable twist) and two or more fibers are twisted in a direction opposite thereto (ply twist).

The term "total denier" used herein means a product of fiber denier and number of fibers to be twisted.

It is preferable that the cord for the circumferential belt layer has a loss tangent (tan δ) of not more than 0.3 under conditions that an initial tension is 1 kgf/cord, a strain amplitude is 0.1%, a frequency is 20 Hz and an atmosphere temperature is 25° C.

In case of requiring greater circumferential rigidity in the circumferential belt layer as compared with the case of using the PET, nylon, PEN or vinylon fiber cords, the cord in the circumferential belt layer is preferably a steel cord having a modulus of elasticity of not less than 3000 kgf/mm² and a twisting structure of 1×N or 1+N in which N is the number of steel filaments.

In preferred embodiments of the invention, a coating rubber for the circumferential belt layer has a modulus of elasticity of not less than 200 kgf/mm², the cord for the circumferential belt layer is spirally wound around the slant belt layer, and the slant belt layer contains steel cords or steel filaments therein. Further the slant belt layer has a cord inclination angle of 15–45° with respect to the equatorial plane, and a gauge of rubber located between the cord of the slant belt layer and the cord of an innermost circumferential belt layer in a radial direction of the tire is made larger in a side end region of the tire than in a central region thereof in the widthwise direction at a radial section of the tire. Further a gauge of rubber located between the cord of an outermost circumferential belt layer in the radial direction and an inner periphery of a tread rubber is made larger in the central region of the tire than in the side end region thereof, at least two circumferential belt layers are disposed in the central region in the widthwise direction of the tire, and at least two circumferential belt layers are disposed in the side end region in the widthwise direction of the tire.

Moreover, the modulus of elasticity of the coating rubber for the circumferential belt layer is calculated from a relationship between load and displacement. This is accomplished by compactly filling a rubber specimen 9 in a cylindrical cavity of a steel jig 8 having a diameter d of 14 mm and a height h of 28 mm as shown in FIG. 7a, setting the jig 8 into a compression testing machine 10 as shown in FIG. 7b and applying a load W onto upper and bottom faces of the rubber specimen 9 at a rate of 0.6 mm/min to measure a displacement by means of a laser displacement meter 11.

BRIEF DESCRIPTION OF THE DRAWINGS

The invention will be described with reference to the accompanying drawings, wherein:

FIG. 1 is a diagrammatically sectional view of a first embodiment of the pneumatic radial tire according to the invention;

FIG. 2 is a diagrammatically sectional view of a second embodiment of the pneumatic radial tire according to the invention;

FIG. 3 is a diagrammatical view illustrating a gauge t1 of rubber located between cord of a slant belt layer 6 and cord of an innermost circumferential belt layer 7 in the radial direction of the tire;

FIG. 4 is a diagrammatical view illustrating a gauge t2 of rubber located between cord of an outermost circumferential belt layer in the radial direction of the tire and an inner peripheral face of a tread rubber;

FIG. 5 is a diagrammatically sectional view of a third embodiment of the pneumatic radial tire according to the invention;

FIG. 6 is a diagrammatically sectional view of a fourth embodiment of the pneumatic radial tire according to the invention.

DESCRIPTION OF THE PREFERRED EMBODIMENTS

Figure 7A:
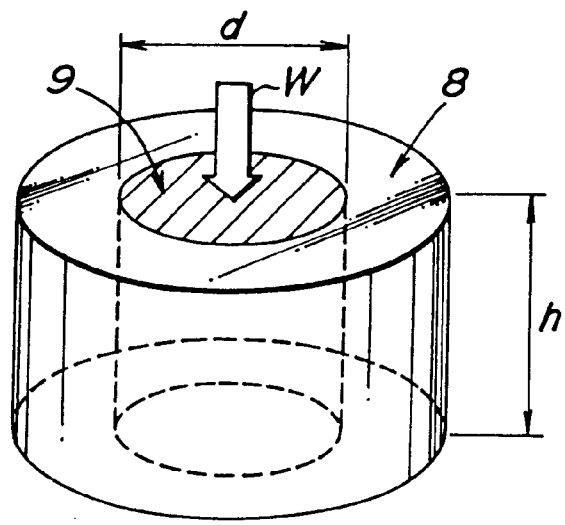
FIGS. 7a and 7b are diagrammatical views illustrating a method for measuring a modulus of elasticity of a coating rubber for a circumferential belt layer.
Figure 7B:
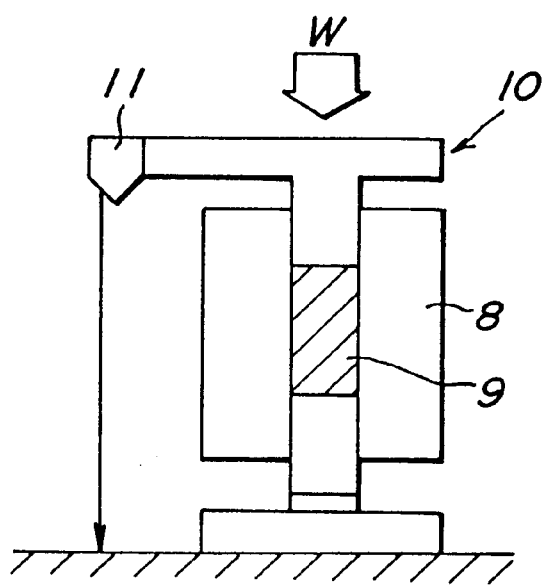

In FIG. 1 diagrammatically show a radial section of a first embodiment of the pneumatic radial tire according to the invention, in which numeral 1 is a pneumatic radial tire, numeral 2 a bead core, numeral 3 a carcass, numeral 4 a crown portion of the carcass, numeral 5 an equatorial plane of the tire, numeral 6 a slant belt layer, and numeral 7 a circumferential belt layer.

In this tire 1, the slant belt layer 6 containing a plurality of cords or filaments arranged at a certain inclination angle with respect to the equatorial plane 5 is superimposed around the crown portion 4 of the carcass 3 toroidally extending between at least a pair of the bead cores 2. Further at least one circumferential belt layer 7 containing a plurality of cords arranged substantially in parallel to the equatorial plane 5 is disposed on the slant belt layer 6.

The cord for the circumferential belt layer 7 is PET fiber cords, nylon fiber cords, PEN fiber cords, vinylon fiber cords or steel cords.

When the PET, nylon, PEN or vinylon fiber cord is used in the circumferential belt layer 7, if the cord has a layer twisting structure, a total denier $D_T$ of 1000 d–6000 d and a twisting coefficient $N_t$ of not more than 0.3 in case of PET or nylon fiber, not more than 0.5 in case of PEN fiber or not more than 0.6 in case of vinylon fiber, sufficient cornering power is obtained.

Moreover, the formation of the layer twisting structure is based on the improvement of resistance to compression fatigue of the cord itself and the operability. When the total denier is less than 1000 d, the cords can not physically be arranged in the circumferential belt layer, while when it exceeds 6000 d, the cord becomes too thick and hence the amount of rubber used undesirably increases to increase tire weight. If the twist constant $N_t$ is too small, there is caused a fear of loosening the cord to degrade the operability, so that the lower limit of the twist constant is 0.1 in all of these organic fiber cords.

In case of using the PET, nylon, PEN or vinylon fiber cords in the circumferential belt layer, the cord braking-up through compression fatigue hardly occurs as compared with the conventionally used aromatic polyamide fiber cord.

Since the organic fibers such as PET, nylon, PEN and vinylon fibers are large in work loss and are apt to generate heat, when these fiber cords are used in the belt layer, there is a possibility that they are fused to bring about tire burst as a result of a test for high-speed durability. For this end, it is favorable to prevent fusion of these fiber cords by rendering the loss tangent (tan δ) of each of these fiber cords used in the circumferential belt layer 7 into not more than 0.3 under conditions that an initial tension is 1 kgf/cord, a strain amplitude is 0.1%, a frequency is 20 Hz and an atmosphere temperature is 25° C.

When the steel cord is used in the circumferential belt layer 7, if the steel cord has a modulus of elasticity of not less than 3000 kgf/mm² and a twisting structure of 1×N or 1+N, the rigidity in the circumferential direction can be more enhanced while somewhat increasing the tire weight as compared with the case of using the above organic fiber cords, whereby satisfactory cornering power can be obtained.

When the modulus of elasticity is less than 3000 kgf/mm², the rigidity can not effectively be enhanced. Further, when the twisting structure is not 1×N or 1+N, the reductions of weight and cost can not be attained.

Moreover, the end count of steel cords in the circumferential belt layer is preferably within a range of 15–50 cords/50 mm from a viewpoint of the maintenance of circumferential rigidity and the weight reduction.

As seen from the above, the cord to be used in the circumferential belt layer 7 can properly be selected from the group consisting of PET fiber cord, nylon fiber cord, PEN fiber cord, vinylon fiber cord and steel cord in accordance with the purpose of use.

On the other hand, even when the cord used in the circumferential belt layer 7 satisfies the above requirements, if the modulus of elasticity of a coating rubber for the circumferential belt layer 7 is too low, the cords are easily moved in the belt layer to cause local buckling of the cord and hence there is a fear of creating cord breaking-up. For this end, the modulus of elasticity of the coating rubber for the circumferential belt layer 7 is restricted to not less than 200 kgf/mm$^2$, whereby cord breaking-up can be prevented.

Moreover, the circumferential belt layer is formed by spirally winding the cord around the slant belt layer, whereby the uniformity of the tire can be improved.

The number of the circumferential belt layers is preferable to be 1–2 from a viewpoint of the weight reduction.

Furthermore, sufficient tire casing strength is obtained by using steel cords or steel filaments in the slant belt layer 6. In this case, the inclination cord angle with respect to the equatorial plane 5 in the slant belt layer is within a range of 15–45° for providing sufficient in-plane shearing rigidity.

As shown in FIG. 3, a gauge t1 of rubber located between the cord of the slant belt layer 6 and the cord of an innermost circumferential belt layer 7 in the radial direction is made larger in a side end region 13 of the tire than in a central region 12 thereof in the widthwise direction at a radial section of the tire. Concretely, the rubber gauge in the side end region 13 is 2 times or more of the rubber gauge in the central region 12. On the other hand, a range L2 maintaining the rubber gauge in the central region 12 is 50–90% of a width L1 of the slant belt layer 6 centering around the equatorial plane 5. Thus, there is created a so-called sandwich beam effect (T. W. Chou and F. K. Ko, "Textile Structural Composite", Elsevir, 1989) and hence the bending rigidity in the circumferential direction becomes relatively lower in the central region 12 than in the side end region 13. Consequently, the ground contacting length of the tire becomes long in the central zone of the tread and short in the shoulder region thereof to put the ground contacting shape of the tire close to a chipped round shape, whereby water existing of ahead the tire during the running on wet road surface can rapidly be discharged sideward from the tire to control the occurrence of hydroplaining.

Since the total thickness T of the slant belt layer 6 and the circumferential belt layer 7 becomes small at a position corresponding to the central region 12 of the tire in the widthwise direction thereof, there may be caused a phenomenon that ruggedness corresponding to the cords in the circumferential belt layer appears in an inner peripheral surface of the tire after the vulcanization at the widthwise central region 12 (cord-exposing phenomenon). In the latter case, a gauge t2 of rubber located between the cord of an outermost circumferential belt layer 7 in the radial direction and an outer peripheral surface of the layer 7 is made larger in the central region 12 of the tire than in the side end region 13 thereof in the widthwise direction as shown in FIG. 4, whereby the total thickness T of the slant belt layer 6 and the circumferential belt layer 7 can be made uniform in the widthwise direction of the tire to prevent the cord-exposing phenomenon.

If it is required to further control the pushing out of the widthwise central region of the tire during running at high speed, the circumferential belt layer 7 is favorably at least two layers in the widthwise central region 12 of the tire. As shown in FIG. 2, two or more belt layers 7-1, 7-2 having a relatively wide width may be arranged as the circumferential belt layer 7.

Although the widths of the two belt layers 7-1 and 7-2 are changed in the embodiment of FIG. 2, two or more circumferential belt layers having a width approximately equal to that of the slant belt layer may be used. Alternatively, as shown in FIG. 5, the circumferential belt layer 7 may be constituted with a width-wide circumferential belt layer 7-1 covering approximately a full surface of the slant belt layer 6 and a width-narrow circumferential belt layer 7-2 covering only a central region of the width-wide circumferential belt layer 7-1. If it is required to further control the separation failure at belt end, the circumferential belt layer 7 is preferred to be at least two layers in the side end region of the tire in the widthwise direction. In this case, the full surface of the slant belt layer may be covered with two or more width-wide circumferential belt layers. Alternatively, the circumferential belt layer 7 may be constituted with a width-wide circumferential belt layer 7-1 covering approximately a full surface of the slant belt layer 6 and a pair of width-narrow circumferential belt layers 7-2 covering only the side end regions of the width-wide circumferential belt layer 7-1 or width-narrow circumferential belt layers 7-2 covering only the side end regions and central region of the width-wide circumferential belt layer 7-1 (FIG. 6). In any case, the width, number and the like of the circumferential belt layer 7 may properly be changed in accordance with the intended use.

The following examples are given in illustration of the invention and are not intended as limitations thereof.

A pneumatic radial tire to be tested has a tire size of 195/65R14 and a construction as shown in FIG. 1, which comprises a carcass 3 toroidally extending between a pair of bead cores 2, one slant belt layer 6 superimposed about a crown portion 4 of the carcass 3 and containing a plurality of steel cords arranged at a given cord angle with respect to an equatorial plane 5 of the tire, and a circumferential belt layer 7 arranged on the slant belt layer 6 and containing a plurality of cords arranged at a cord angle of approximately 0° with respect to the equatorial plane 5. In this case, the circumferential belt layer 7 is formed by spirally winding the cord on the slant belt layer.

Moreover, Table 1 shows the number of the circumferential belt layers 7 (at central region and side end region), the material, twisting structure, total denier, twist constant, loss tangent and end count of the cord used in the circumferential belt layer 7, the modulus of elasticity of the coating rubber for the circumferential belt layer 7, the material and inclination angle with respect to the equatorial plane 5 in the cord of the slant belt layer 6, the gauge t1 of rubber located between the cord of the slant belt layer 6 and the cord of the innermost circumferential belt layer 7 in the radial direction (at central region and side end region) and the gauge t2 of rubber located between the cord of the outermost circumferential belt layer 7 in the radial direction and the inner peripheral surface of the tread rubber (at central region and side end region). In Table 1, tire Nos. 1–15 are examples, tire Nos. 16–18 are comparative examples, and tire Nos. 19–20 are conventional examples.

The other construction of the above tires is the same as in the conventional pneumatic radial tire for passenger cars.

TABLE 1

| | Circumferential belt layer | | | | | | | | Cord of slant belt layer | | Rubber gauge t1 (mm) | | Rubber gauge t2 (mm) | |
|---|---|---|---|---|---|---|---|---|---|---|---|---|---|---|
| | Number of layers | | Cord | | | | | Elastic modulus of coating | | | | | | |
| Tire No. | central region | side region | material | twisting structure | total denier | twist constant | loss tangent | end count | rubber (kgf/mm²) | material | angle (°) | central region | side region | central region | side region |
| Example | | | | | | | | | | | | | | | |
| 1 | 1 | 1 | PET | layer structure | 1500d/3 | 0.15 | 0.25 | 50 | 250 | STEEL | 40 | 0.08 | 0.5 | 0.7 | 0.2 |
| 2 | 1 | 1 | PET | layer structure | 1500d/3 | 0.15 | 0.20 | 50 | 250 | STEEL | 40 | 0.08 | 0.5 | 0.7 | 0.2 |
| 3 | 1 | 1 | PET | layer structure | 1500d/3 | 0.30 | 0.45 | 50 | 250 | STEEL | 40 | 0.08 | 0.5 | 0.7 | 0.2 |
| 4 | 1 | 1 | PET | layer structure | 1500d/3 | 0.20 | 0.45 | 50 | 250 | STEEL | 40 | 0.08 | 0.5 | 0.7 | 0.2 |
| 5 | 2 | 1 | PET | layer structure | 1500d/3 | 0.15 | 0.25 | 50 | 250 | STEEL | 40 | 0.08 | 0.5 | 0.7 | 0.2 |
| 6 | 1 | 2 | PET | layer structure | 1500d/3 | 0.15 | 0.25 | 50 | 250 | STEEL | 40 | 0.08 | 0.5 | 0.7 | 0.2 |
| 7 | 2 | 1 | PET | layer structure | 1500d/3 | 0.15 | 0.25 | 50 | 250 | STEEL | 40 | 0.08 | 0.5 | 0.7 | 0.2 |
| 8 | 2 | 1 | 66 NYLON | layer structure | 1500d/3 | 0.09 | 0.18 | 50 | 250 | STEEL | 40 | 0.08 | 0.5 | 0.7 | 0.2 |
| 9 | 1 | 1 | STEEL | 1 + 6 × 0.24, elastic modulus: 14500 kgf/mm² | | | | 20 | 250 | STEEL | 40 | 0.08 | 0.5 | 0.7 | 0.2 |
| 10 | 1 | 1 | PET | layer structure | 1500d/3 | 0.15 | 0.25 | 50 | 180 | STEEL | 40 | 0.08 | 0.5 | 0.7 | 0.2 |
| 11 | 1 | 1 | PET | layer structure | 1500d/3 | 0.15 | 0.25 | 50 | 250 | STEEL | 40 | 0.08 | 0.08 | 0.7 | 0.8 |
| 12 | 1 | 1 | PET | layer structure | 1500d/3 | 0.15 | 0.25 | 50 | 250 | STEEL | 40 | 0.08 | 0.5 | 0.2 | 0.2 |
| 13 | 1 | 1 | PET | layer structure | 1500d/3 | 0.15 | 0.25 | 50 | 250 | STEEL | 50 | 0.08 | 0.5 | 0.7 | 0.2 |
| 14 | 1 | 1 | PEN | layer structure | 1500d/2 | 0.25 | 0.21 | 50 | 250 | STEEL | 40 | 0.08 | 0.5 | 0.7 | 0.2 |
| 15 | 1 | 1 | PVA | layer structure | 1500d/2 | 0.32 | 0.18 | 50 | 250 | STEEL | 40 | 0.08 | 0.5 | 0.7 | 0.2 |
| Comparative Example | | | | | | | | | | | | | | | |
| 16 | 1 | 1 | PET | layer structure | 1500d/3 | 0.35 | 0.25 | 50 | 250 | STEEL | 40 | 0.08 | 0.5 | 0.7 | 0.2 |
| 17 | 1 | 1 | PET | layer structure | 1500d/3 | 0.35 | 0.45 | 50 | 250 | STEEL | 40 | 0.08 | 0.5 | 0.7 | 0.2 |
| 18 | 1 | 1 | PET | layer structure | 1500d/3 | 0.35 | 0.25 | 50 | 180 | STEEL | 40 | 0.08 | 0.5 | 0.7 | 0.2 |
| Conventional Example | | | | | | | | | | | | | | | |
| 19 | 1 | 1 | 66 NYLON | layer structure | 1260d/3 | 0.48 | 0.25 | 50 | 250 | STEEL, two layers | ±22 | 0.08 | 0.5 | 0.7 | 0.2 |

TABLE 1-continued

| | Circumferential belt layer | | | | | | | | | Cord of slant belt layer | | Rubber gauge t1 (mm) | | Rubber gauge t2 (mm) | |
|---|---|---|---|---|---|---|---|---|---|---|---|---|---|---|---|
| | Number of layers | | | Cord | | | | | Elastic modulus of coating rubber (kgf/mm²) | | | | | | |
| Tire No. | central region | side region | material | structure | total denier | twist constant | tangent | loss end count | | material | angle (°) | central region | side region | central region | side region |
| 20 | none | none | — | — | — | — | — | — | — | STEEL, two layers | ±22 | 0.08 | 0.5 | 0.7 | 0.2 |

Test Method

The tests for evaluating the cornering property, high-speed durability and durability are carried out with respect to these test tires.

(1) Test for the Evaluation of Cornering Property

The cornering property is evaluated by measuring the cornering power.

The test tire subjected to an internal pressure of 1.7 kgf/cm² is set on a drum of 3000 mm in outer diameter and trained at a speed of 30 km/h under a load defined from the tire size and internal pressure according to JATMA or JIS for 30 minutes. After the internal pressure is adjusted to 1.7 kgf/cm² under no load, the tire is run on the drum at the same speed under the same load as mentioned above while varying a slip angle with respect to the circumferential line of the drum within a range of ±1° to ±4°, during which an average value of cornering force (CF) at each slip angle is measured. Then, the cornering power (CP value) is calculated by substituting these average values to the following equation:

$$CP(kgf/deg)=[CF(kgf/1°)+CF(kgf/2°)/2+CF(kgf/3°)/3+CF(kgf/4°)/4]\div 4$$

The test results are shown in Table 2. In this case, the CP value is represented by an index value on the basis that Conventional Example 19 is 100, in which the larger the index value, the better the cornering property.

(2) Test for the Evaluation of High-speed Durability

High-speed durability is evaluated by increasing the running speed of the test tire on a drum every 30 minutes according to a test of step-speed system defined in FMVSS No. 109 until the occurrence of tire trouble to measure a speed (km/h) at the occurrence of tire trouble. The test results are also shown in Table 2. High-speed durability is represented by an index value on the basis that Conventional Example 19 is 100. The larger the index value, the better the high-speed durability.

(3) Test for the Evaluation of Durability

The test tire subjected to an inner pressure of 1.0 kgf/cm² is run on a drum at a slip angle of 8° under a maximum load defined in JATMA for 16 hours, and thereafter the tire is cut to measure the presence or absence of cord breaking-up in the circumferential belt layer, whereby the durability is evaluated. The test results are also shown in Table 2, in which the occurrence of cord breaking-up is described as "presence" and no occurrence is described as "absence".

TABLE 2

| | Test results | | |
|---|---|---|---|
| Tire No. | Cornering property | High-speed durability | Durability |
| Example | | | |
| 1 | 108 | 115 | absence |
| 2 | 108 | 117 | absence |
| 3 | 101 | 90 | absence |
| 4 | 105 | 95 | absence |
| 5 | 108 | 115 | absence |
| 6 | 110 | 115 | absence |
| 7 | 108 | 115 | absence |
| 8 | 102 | 112 | absence |
| 9 | 121 | 120 | absence |
| 10 | 108 | 110 | presence |
| 11 | 108 | 115 | absence |
| 12 | 108 | 105 | absence |
| 13 | 102 | 100 | absence |
| 14 | 104 | 105 | absence |
| 15 | 109 | 110 | absence |
| Comparative Example | | | |
| 16 | 95 | 95 | absence |
| 17 | 95 | 90 | absence |
| 18 | 94 | 93 | presence |
| Conventional Example | | | |
| 19 | 100 | 100 | absence |
| 20 | 97 | 90 | absence |

As seen from the test results of Table 2, the tire Nos. 1–15 of the examples are excellent in the cornering property as compared with the tire No. 19 of the conventional example. Furthermore, the tires of the examples other than the tire Nos. 3, 4 and 10 are excellent in the durability and high-speed durability. Moreover, the tire Nos. 3 and 4, in which the loss tangent of the cord in the circumferential belt layer is somewhat outside the preferable range, are somewhat poor in the high-speed durability as compared with the tire No. 19 of the conventional example, while the occurrence of cord breaking-up is observed in the tire No. 10 in which the modulus of elasticity of the coating rubber for the circumferential belt layer is somewhat smaller than the preferable range.

Moreover, the cornering property is relatively poor in the tire No. 13 in which the inclination cord angle of the slant belt layer is somewhat larger than the preferable range as compared with the tire No. 1.

In the tire Nos. 16–18 of the comparative examples, the twist constant of the cord in the circumferential belt layer is larger than the range defined in the invention, so that the cornering property is poor as compared with the tire Nos. 1–15.

The tire No. 20 of the conventional example is poor in cornering property and high-speed durability as compared with the tire Nos. 1–15, while the tire No. 19 of the conventional example has a belt comprised of cross belt layers and circumferential belt layer and is fairly large in the tire weight as compared with the tire No. 1.

For the reference, the drainage property and cord-exposing phenomenon are measured with respect to these test tires. As a result, the drainage property is somewhat poor in the tire No. 11 and the occurrence of cord exposing phenomenon is observed in the tire No. 12 among the tire Nos. 1–15 of the examples, while the tire Nos. 1–10 and 13–15 are good in drainage property and have no cord exposing phenomenon.

According to the invention, the rationalized PET, nylon, PEN or vinylon fiber cords or high-strength steel cords as previously mentioned are used in the circumferential belt layer, so that it is possible to provide pneumatic radial tires for use in the general-purpose passenger cars having improved cornering property, satisfactory durability and/or high-speed durability and light weight.

What is claimed is:

1. A pneumatic radial tire comprising a carcass toroidally extending between at least a pair of bead cores and a belt superimposed on a crown portion of the carcass and comprised of a single slant belt layer containing a plurality of cords or filaments arranged at a given inclination angle with respect to an equatorial plane of the tire and at least one circumferential belt layer laminated on the slant belt layer and containing a plurality of cords arranged substantially in parallel to the equatorial plane, wherein each cord used in the at least one circumferential belt layer is made from vinylon fiber and has a layer twisting structure and a total denier $D_T$ of 1000 d–6000 d and a twist constant $N_t=T\times(0.139\times D_T/2\times1/\rho)^{1/2}\times10^{-3}\leq0.6$ wherein T is a twisting number (twist turns/10 cm) and $\rho$ is a specific gravity, wherein a coating rubber for the at least one circumferential belt layer has a modulus of elasticity of not less than 200 kgf/mm$^2$.

2. A pneumatic radial tire according to claim 1, wherein each cord for the at least one circumferential belt layer has a loss tangent (tan δ) of not more than 0.3 under conditions that an initial tension is 1 kgf/cord, a strain amplitude is 0.1%, a frequency is 20 Hz and an atmosphere temperature is 25° C.

3. A pneumatic radial tire according to claim 1, wherein each cord for the at least one circumferential belt layer is spirally wound around the slant belt layer.

4. A pneumatic radial tire according to claim 1, wherein the plurality of cords or filaments in the slant belt layer are steel cords or steel filaments.

5. A pneumatic radial tire according to claim 1, wherein the slant belt layer has a cord inclination angle of 15–45° with respect to the equatorial plane.

6. A pneumatic radial tire according to claim 1, wherein a gauge (t1) of rubber located between the cords of the slant belt layer and the cords of an innermost circumferential belt layer in a radial direction of the tire is made larger in side end regions of the tire than in a central region thereof in the widthwise direction at a radial section of the tire.

7. A pneumatic radial tire according to claim 1, wherein a gauge (t2) of rubber located between the cords of an outermost circumferential belt layer in the radial direction and an inner periphery of a tread rubber is made larger in the central region of the tire than in side end regions thereof in the widthwise direction at a radial section of the tire.

8. A pneumatic radial tire according to claim 1, wherein said at least one circumferential belt layer is two circumferential belt layers disposed in the central region in the widthwise direction of the tire.

9. A pneumatic radial tire according to claim 1, wherein said at least one circumferential belt layer is at least two circumferential belt layers disposed in side end regions in the widthwise direction of the tire.

10. A pneumatic radial tire comprising a carcass toroidally extending between at least a pair of bead cores and a belt superimposed on a crown portion of the carcass and comprised of a single slant belt layer containing a plurality of cords or filaments arranged at a given inclination angle with respect to an equatorial plane of the tire and at least one circumferential belt layer laminated on the slant belt layer and containing a plurality of cords arranged substantially in parallel to the equatorial plane, wherein each cord used in the at least one circumferential belt layer is made from vinylon fiber and has a layer twisting structure and a total denier $D_T$ of 1000 d–6000 d and a twist constant $N_t=T\times(0.139\times D_T/2\leq1/\rho)^{1/2}\times10^{-3}\leq0.6$ wherein T is a twisting number (twist turns/10 cm) and $\rho$ is a specific gravity, wherein a gauge (t1) of rubber located between the cords of the slant belt layer and the cords of an innermost circumferential belt layer in a radial direction of the tire is made larger in side end regions of the tire than in a central region thereof in the widthwise direction at a radial section of the tire, and a width (L2) of the central region is 50–90% of a width (L1) of the slant belt layer centering around the equatorial plane.

11. A pneumatic radial tire according to claim 10, wherein each cord for the at least one circumferential belt layer has a loss tangent (tan δ) of not more than 0.3 under conditions that an initial tension is 1 kgf/cord, a strain amplitude is 0.1%, a frequency is 20 Hz and an atmosphere temperature is 25° C.

12. A pneumatic radial tire according to claim 10, wherein the slant belt layer has a cord inclination angle of 15–45° with respect to the equatorial plane.

13. A pneumatic radial tire comprising a carcass toroidally extending between at least a pair of bead cores and a belt superimposed on a crown portion of the carcass and comprised of a single slant belt layer containing a plurality of cords or filaments arranged at a given inclination angle with respect to an equatorial plane of the tire and at least one circumferential belt layer laminated on the slant belt layer and containing a plurality of cords arranged substantially in parallel to the equatorial plane, wherein each cord used in the at least one circumferential belt layer is made from vinylon fiber and has a layer twisting structure and a total denier $D_T$ of 1000 d–6000 d and a twist constant $N_t=T\times(0.139\times D_T/2\times1/\rho)^{1/2}\times10^{-3}\leq0.6$ wherein T is a twisting number (twist turns/10 cm) and $\rho$ is a specific gravity, wherein a gauge (t2) of rubber located between the cords of an outermost circumferential belt layer in the radial direction and an outer peripheral surface of said outermost circumferential layer is made larger in the central region of the tire than in side end regions thereof in the widthwise direction at a radial section of the tire.

14. A pneumatic radial tire according to claim 13, wherein each cord for the at least one circumferential belt layer has a loss tangent (tan δ) of not more than 0.3 under conditions that an initial tension is 1 kgf/cord, a strain amplitude is 0.1%, a frequency is 20 Hz and an atmosphere temperature is 25° C.

15. A pneumatic radial tire according to claim 13, wherein the slant belt layer has a cord inclination angle of 15–45° with respect to the equatorial plane.

* * * * *